US010592511B2

(12) United States Patent
Vora et al.

(10) Patent No.: US 10,592,511 B2
(45) Date of Patent: *Mar. 17, 2020

(54) SEARCH CLIENT CONTEXT ON ONLINE SOCIAL NETWORKS

(71) Applicant: Facebook, Inc., Menlo Park, CA (US)

(72) Inventors: Abhinav Vora, San Francisco, CA (US); Allan Stewart, Menlo Park, CA (US)

(73) Assignee: Facebook, Inc., Menlo Park, CA (US)

(*) Notice: Subject to any disclaimer, the term of this patent is extended or adjusted under 35 U.S.C. 154(b) by 356 days.

This patent is subject to a terminal disclaimer.

(21) Appl. No.: 15/499,720

(22) Filed: Apr. 27, 2017

(65) Prior Publication Data

US 2017/0228437 A1 Aug. 10, 2017

Related U.S. Application Data

(63) Continuation of application No. 14/284,318, filed on May 21, 2014, now Pat. No. 9,679,078.

(51) Int. Cl.
G06F 16/2457 (2019.01)
G06F 16/248 (2019.01)
G06F 16/951 (2019.01)
G06F 16/901 (2019.01)
G06F 16/9032 (2019.01)

(52) U.S. Cl.
CPC ...... *G06F 16/24575* (2019.01); *G06F 16/248* (2019.01); *G06F 16/24578* (2019.01); *G06F 16/9024* (2019.01); *G06F 16/90324* (2019.01); *G06F 16/951* (2019.01)

(58) Field of Classification Search
CPC ......... G06F 16/24575; G06F 16/24578; G06F 16/90324; G06F 16/951; G06F 16/248; G06F 16/9024
USPC .......................................................... 707/706
See application file for complete search history.

(56) References Cited

U.S. PATENT DOCUMENTS

| 2011/0264656 | A1* | 10/2011 | Dumais | G06F 16/9537 |
| | | | | 707/728 |
| 2012/0131009 | A1* | 5/2012 | Nath | G06Q 30/0282 |
| | | | | 707/741 |
| 2012/0158720 | A1* | 6/2012 | Luan | G06Q 30/0224 |
| | | | | 707/732 |
| 2012/0166411 | A1* | 6/2012 | MacLaurin | G06F 16/951 |
| | | | | 707/706 |

(Continued)

*Primary Examiner* — Evan Aspinwall
(74) *Attorney, Agent, or Firm* — Jordan IP Law, LLC

(57) ABSTRACT

In one embodiment, a method includes receiving, from a client system, a query inputted by a first user at a search client, the search client being associated with context data from a page associated with the search client. The context data identifies: a type of the page associated with the search client, a social context of the page associated with the search client, and a threshold number of search results for display. The method includes identifying one or more entities matching the query and ranking each of the identified entities based at least in part on the social context and the type of the page associated with the search client. The method includes sending, to the client system, instructions for presenting a search-results interface including the threshold number of search results corresponding to the threshold number of top ranking identified entities.

22 Claims, 8 Drawing Sheets

(56) References Cited

U.S. PATENT DOCUMENTS

2012/0271831 A1* 10/2012 Narayanan .......... G06F 16/9535
707/741
2013/0066885 A1* 3/2013 Komuves ............... G06Q 10/10
707/748

* cited by examiner

600

610 — accessing a social graph comprising a plurality of nodes and a plurality of edges connecting the nodes, each of the edges between two of the nodes representing a single degree of separation between them

620 — receiving from the first user a query inputted by the first user at a search client, the search client being associated with context data from a page associated with the search client, where the context data identifies one or more second nodes of the plurality of second nodes associated with the page

630 — generating one or more search results corresponding to the query, where each search result corresponds to a node of the plurality of the nodes

640 — scoring the search results based at least in part on the context data associated with the search client

650 — sending one or more of the search results to the first user for display based on the scores of the search results

*FIG. 6*

ID
SEARCH CLIENT CONTEXT ON ONLINE SOCIAL NETWORKS

PRIORITY

This application is a continuation under 35 U.S.C. § 120 of U.S. patent application Ser. No. 14/284,318, filed 21 May 2014.

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a social-networking system may receive a search query from a user via a search client associated with a page or other content. The search techniques described herein can improve a search query by generating a rewritten query command based on search context data extracted from the page or from other content at which the user inputs the query. The re-written query may expand the search to identify users who are related to the querying user or to the search context data in some way, e.g., by being friends of friends of the querying user. The search client can generate the search context data by extracting signals from the page or other type of content associated with the search client. The signals may be data items included in the page in a structured format. The signals may include social context data, such as an owner of the content or page, commenters, tags, comments, likes, and so on. The query can then be rewritten to expand the search to objects identified by the signals, such as users who have commented on posts on the page. The search results can also be ranked by relevance to the user and the page by using the signals as features in machine-learning ranking techniques.

BRIEF DESCRIPTION OF THE DRAWINGS

FIG. 6 illustrates an example method for optimizing search results based on contextual information.

DESCRIPTION OF EXAMPLE EMBODIMENTS

System Overview

Figure 1:
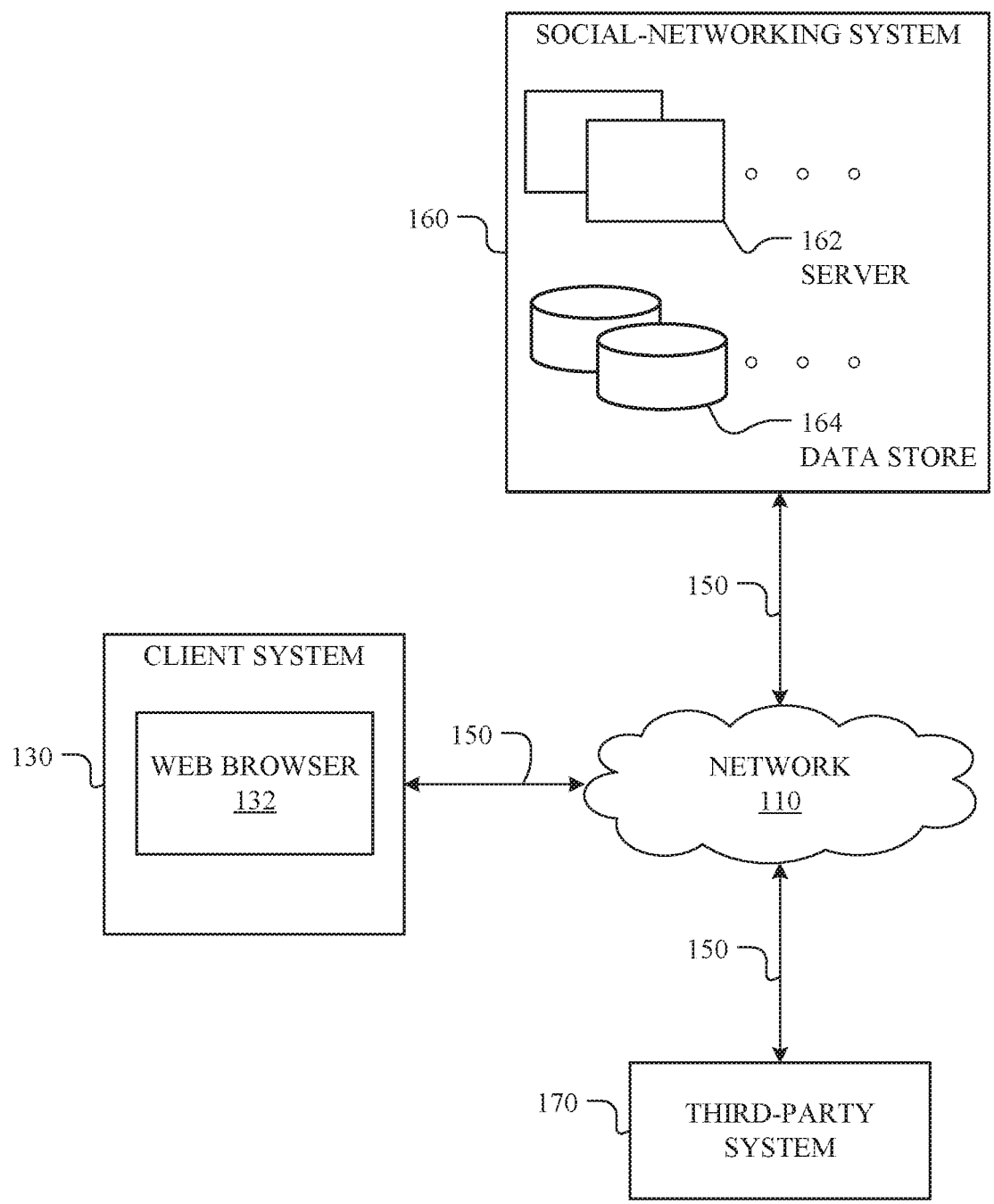
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Ad-pricing modules may combine social information, the current time, location information, or other suitable information to provide relevant advertisements, in the form of notifications, to a user.

Social Graphs

Figure 2:
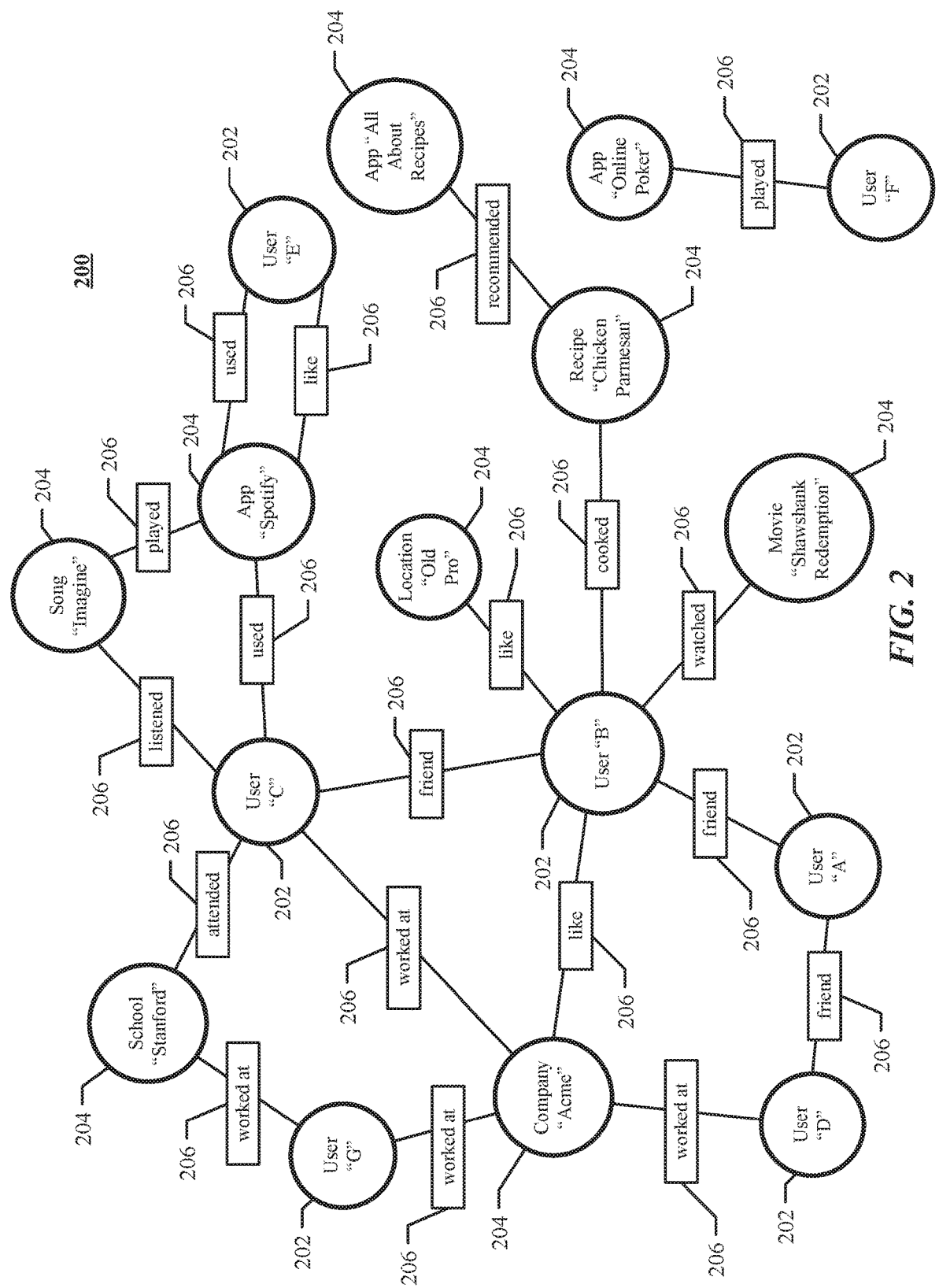
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a first user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a first user registers for an account with social-networking system 160, social-networking system 160 may create a first user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Typeahead Processes

In particular embodiments, one or more client-side and/or back-end (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more front-end (client-side) and/or back-end (server-side) typeahead processes (hereinafter referred to simply as "typeahead process") executing at (or within) the social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, the social-networking system 160 can also provide users with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the front-end typeahead process may transmit the entered character string as a request (or call) to the back-end typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also transmit before, after, or with the request a section identifier (section ID) that identifies the particular section of the particular page in which the user is making the declaration. In particular embodiments, a user ID parameter may also be sent, but this may be unnecessary in some embodiments, as the user may already be "known" based on the user having logged into (or otherwise been authenticated by) the social-networking system 160.

In particular embodiments, the typeahead process may use one or more matching algorithms to attempt to identify matching social-graph elements. In particular embodiments, when a match or matches are found, the typeahead process may transmit a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

Search Queries and Search Clients

Figure 3A:
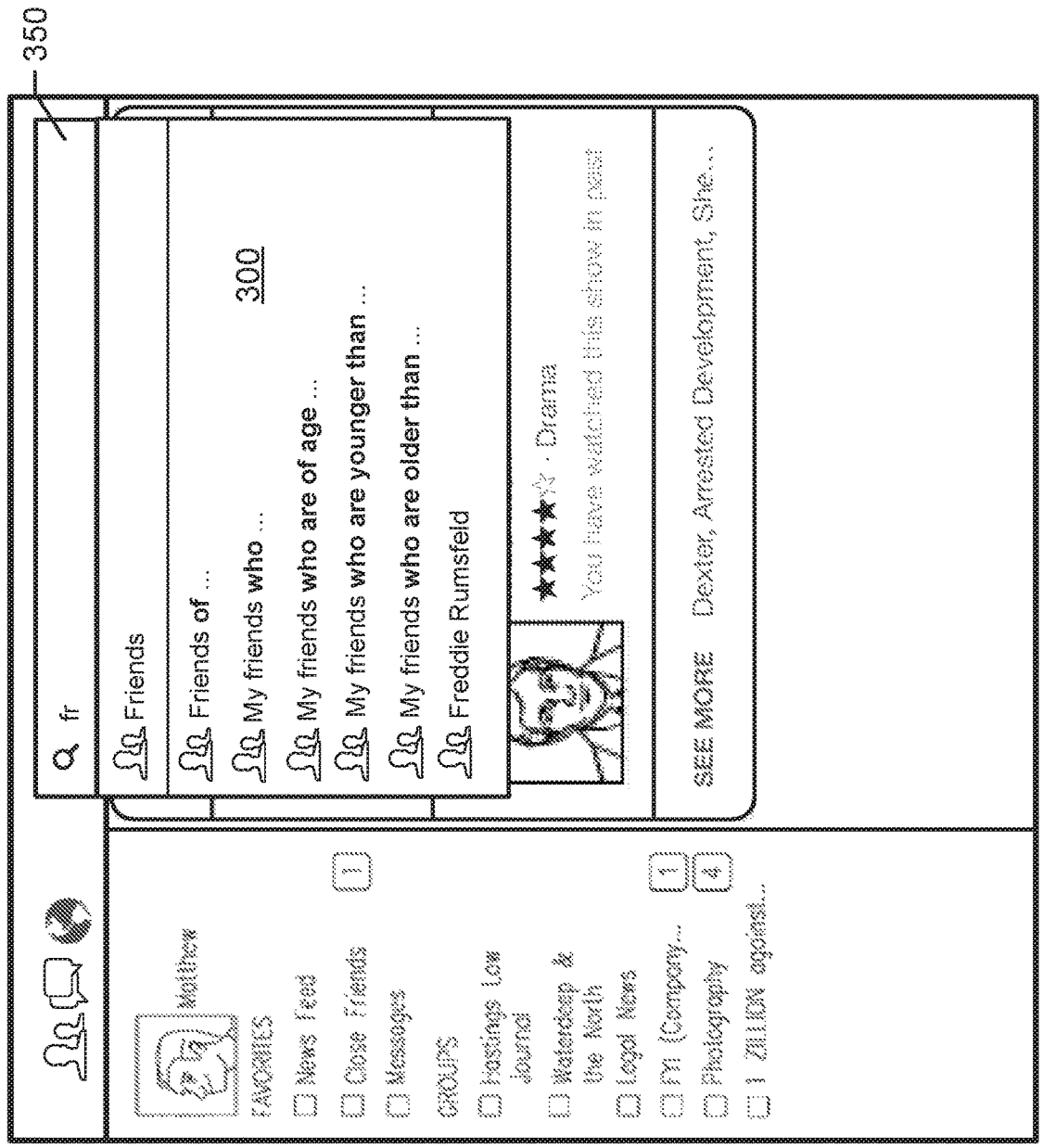
FIG. 3A illustrates an example webpage of an online social network.
Figure 3B:
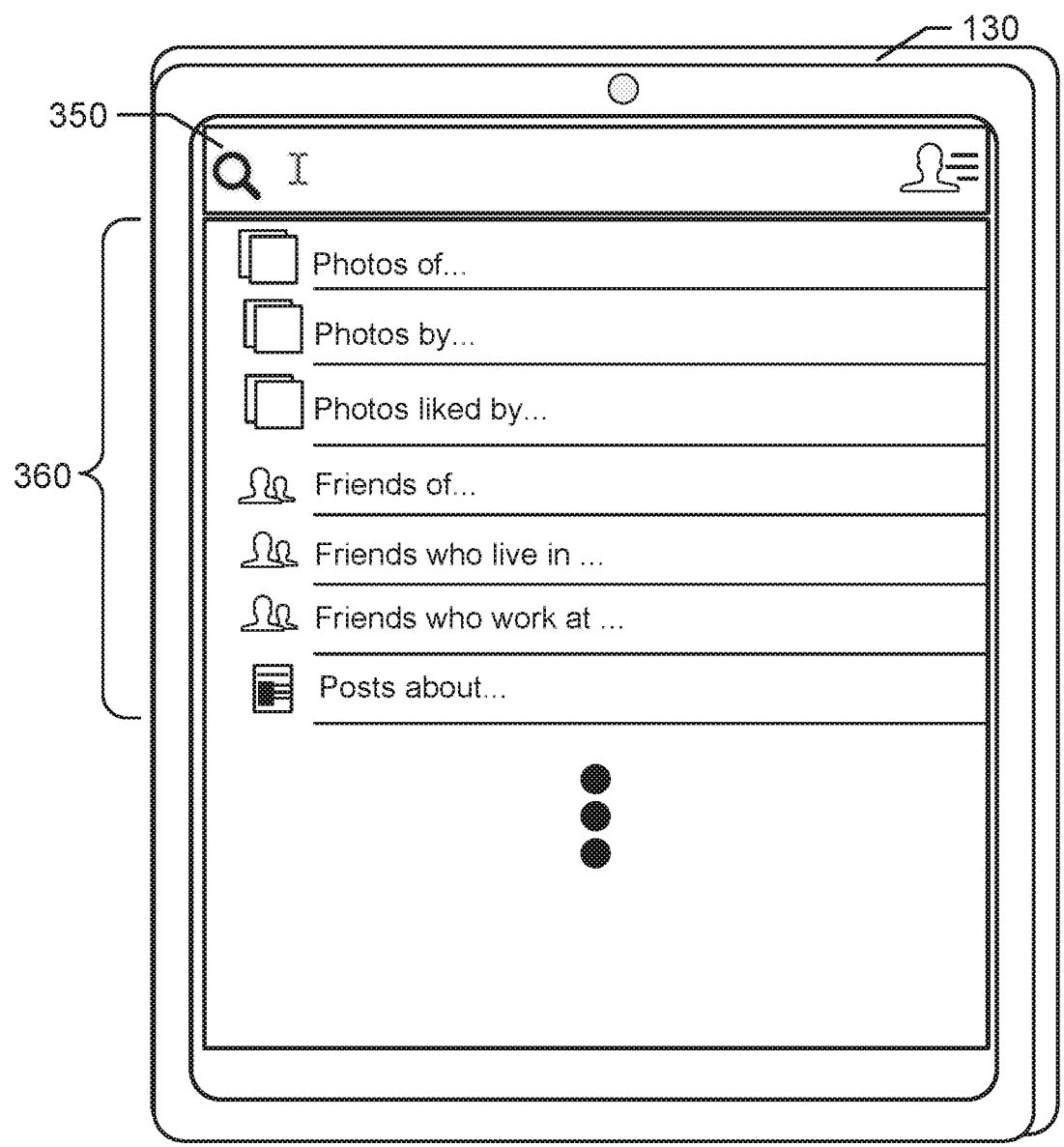
FIG. 3B illustrate an example user interface (UI) on a mobile client system.

FIGS. 3A and 3B illustrate example user interfaces of an online social network. In particular embodiments, social-networking system 160 may receive from a querying/first user (corresponding to a first user node 202) a search query. The user interface (UI) of a client system 130 may include a search-query field 350 configured to receive the search query from the querying user. In particular embodiments, the UI may be provided by a native application associated with the online social network or by a webpage of the social-networking system accessed by a browser client. The search query may be a text query, and may comprise one or more character strings, which may include one or more n-grams as described below. A user may input a character string comprising one or more characters into query field 350 to search for objects in social-networking system 160 that substantially match the character string. The search query may also be a structured query comprising references to particular nodes or edges from social graph 200. The structured queries may be based on the natural-language strings generated by one or more grammars, as described in U.S. patent application Ser. No. 13/674,695, filed 12 Nov. 2012, and U.S. patent application Ser. No. 13/731,866, filed 31 Dec. 2012, each of which is incorporated by reference. As an example and not by way of limitation, the search query "Friends of Stephanie" may be a structured query, where "Friends" and "Stephanie" in the search query are references corresponding to particular social-graph elements. The reference to "Stephanie" corresponds to a particular user node 202 (where social-networking system 160 has parsed the n-gram "my girlfriend" to correspond with a user node 202 for the user "Stephanie"), while the reference to "Friends" corresponds to friend-type edges 206 connecting that user node 202 to other user nodes 202 (i.e., edges 206 connecting to "Stephanie's" first-degree friends). The search query may be received in any suitable manner, such as, for example, when the user inputs the search query into a query field 350 on a webpage of the online social network, as shown in FIG. 3A, or into a native application associated with the online social network, as shown in FIG. 3B.

In particular embodiments, social-networking system 160 may receive from a querying/first user (corresponding to a first user node 202) an unstructured text query. As an example and not by way of limitation, a first user may want to search for other users who: (1) are first-degree friends of the first user; and (2) are associated with Stanford University (i.e., the user nodes 202 are connected by an edge 206 to the concept node 204 corresponding to the school "Stanford"). The first user may then enter a text query "friends stanford" into query field 350. As the querying user enters this text query into query field 350, social-networking system 160 may provide various suggested structured queries and/or typeahead suggestions for matching entries, as illustrated in a drop-down menu 300 or display area 360. As used herein, an unstructured text query refers to a simple text string inputted by a user. The text query may, of course, be structured with respect to standard language/grammar rules (e.g. English language grammar). However, the text query will ordinarily be unstructured with respect to social-graph elements. In other words, a simple text query does not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query is not necessarily in the format of a query command that is directly executable by a search engine. For example, the text query "friends stanford" could be parsed to form the query command "intersect (school(Stanford University), friends(me))", which could be executed as a query in a social-graph database. As the querying user enters text query into query field 350, social-networking system 160 may provide typeahead suggestions for matching entries, e.g., a user "Freddie Rumsfeld," for a user matching the typed prefix "fr" in addition to the suggested structured queries. Although this disclosure describes receiving particular queries in a particular manner, this disclosure contemplates receiving any suitable queries in any suitable manner. More information on search queries may be found in U.S. patent application Ser. No. 13/556,060, filed 23 Jul. 2012, and U.S. patent application Ser. No. 13/732,175, filed 31 Dec. 2012, each of which is incorporated by reference.

In particular embodiments, social-networking system 160 may parse the search query received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. An n-gram of size one can be referred to as a "unigram," of size two can be referred to as a "bigram" or "digram," of size three can be referred to as a "trigram," and so on. Each n-gram may include one or more parts from the search query received from the querying user. In particular embodiments, each n-gram may comprise a character string (e.g., one or more characters of text) entered by the first user. As an example and not by way of limitation, social-networking system 160 may parse the search query "all about recipes" to identify the following n-grams: all; about; recipes; all about; about recipes; all about recipes. In particular embodiments, each n-gram may comprise a contiguous sequence of n items from the search query. Although this disclosure describes parsing particular queries in a particular manner, this disclosure contemplates parsing any suitable queries in any suitable manner. In connection with element detection and parsing search queries, particular embodiments may utilize one or more systems, components, elements, functions, methods, operations, or steps disclosed in U.S. patent application Ser. No. 13/556,072, filed 23 Jul. 2012, U.S. patent application Ser. No. 13/732,101, filed 31 Dec. 2012, each of which is incorporated by reference.

Rewriting Search Queries

Figure 4:
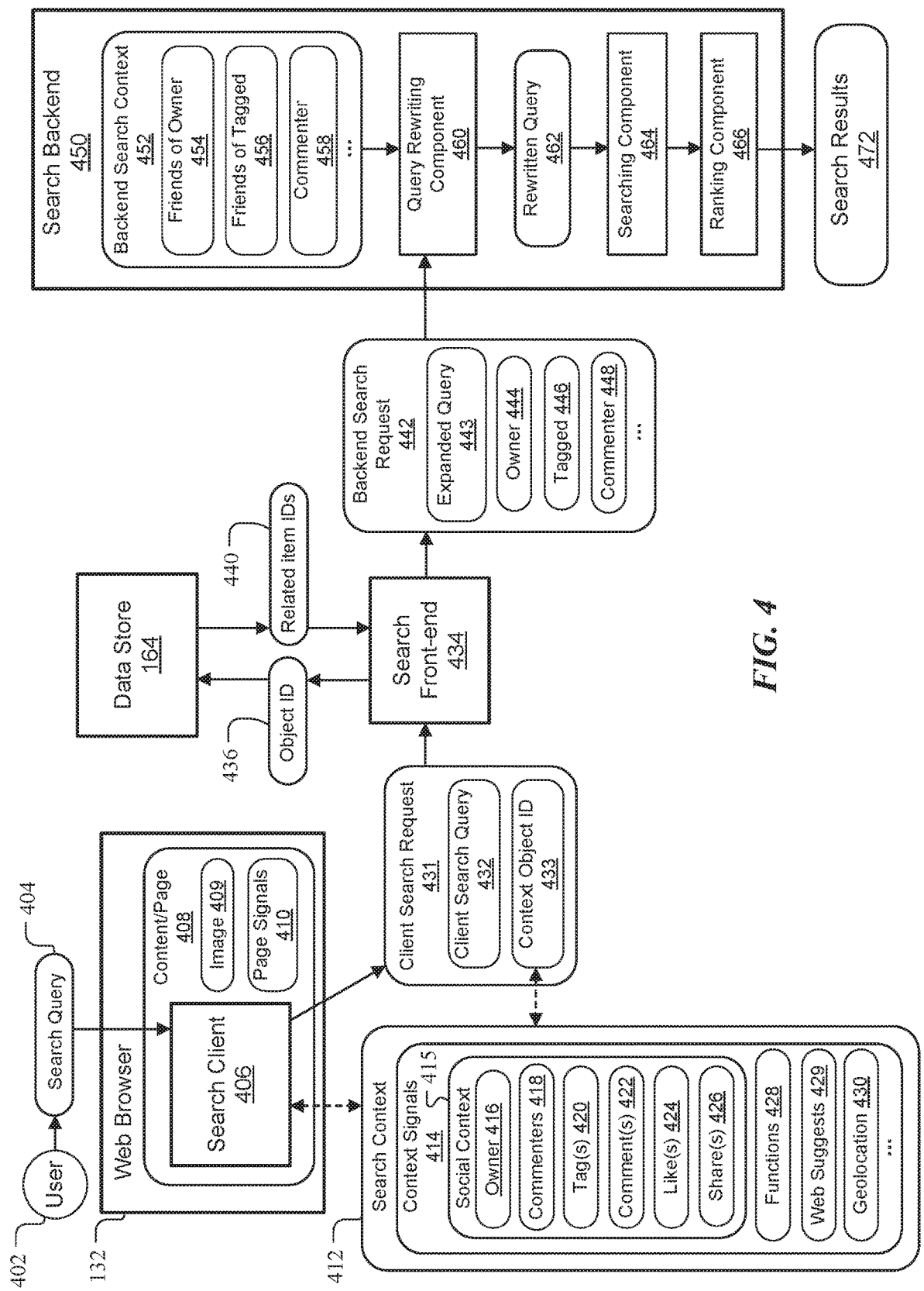
FIG. 4 illustrates an example search query pipeline.

FIG. 4 illustrates an example search query pipeline. In particular embodiments, social-networking system 160 may receive a search query 404 from a user 402. The social-networking system 160 may restrict the search to friends of the user 402, in which case users who are not friends of the user 402 may not be included in the search results, even if those users otherwise match the search query. Searching all users of the online social network may produce a large number of search results. For example, a search for a user with a common name, such as "Mark Smith," is likely to return a large number of users. The search query pipeline shown in FIG. 4 may improve a search query 404 by generating a rewritten query command 462 based on the search query 404 received from the querying user 402. The re-written query 462 may expand the search to identify users who are related to the querying user or to search context data 412 in some way, e.g., by being friends-of-friends of the querying user. As an example and not by way of limitation, a query-rewriting component 460 may generate the rewritten query 462 based on a client-generated search query 432, back-end search context data 452, search context data 412, and/or related items 440 identified in a back-end search request 442. The back-end search context may be based on corresponding items in the back-end search request 442. For example, the friends of owner 454 may be based on the owner item 444, the friends of tagged 456 may be based on the tagged item 445, and the commenter 458 may be based on the commenter item 448. The client-generated search query 432 may be a structured query generated by a search client 406 based on the user-provided search query 404. The search client 406 may be part of a user interface (UI) on web browser 132 of client system 130, or may be part of a UI on a native application of client system 130. As an example and not by way of limitation, a tagging UI of web browser 132 may be configured to display a digital image 409 and allow tagging one or more users in the digital image 409, e.g., by associating each user's ID with portions of the image in which the user appears. As further described below, suggested tags may be retrieved through the automatically-generated client search query 432 generated by the UI.

In particular embodiments, as introduced above, the client-generated search query 432 may include or be based upon search context data 412 associated with the particular search client 406 generating the search query 432. The search client 406 can generate the search context data 412 by extracting page signals 410 from the content or page 408 associated with the search client 406 in the web browser 132. The content or page 408 may include one or more types of content, such as a post, a digital image, or other digital media object. The search client 406 can be displayed on or in association with the content or page 408. The search client 406 can be displayed when, for example, the user 402 has selected a command to indicate that the user likes or wishes to share the content or page 408, or an image, post, page, or other content item displayed on or in association with the content or page 408. The page signals 410 may be data items included in the content or page 408 in a structured format. The content or page 408 can be parsed or processed to extract the data items for each type of signal 414, if present. Upon being extracted from the content or page 408, the page signals 410 may be stored in the search context data 412 as context signals 414. The context signals 414 may include social context data 415, such as an owner 416 of the content or page 408, commenters 418, tags 420, comments 422, likes 424, shares 426, and so on. As an example and not by way of limitation, in a comment-tag context, e.g., when a tag identifying a user is added to a comment, the search context data 412 may include a tag signal 420 that identifies a user being tagged in the content or page 408. The search context data 412 may also include information that identifies the particular search client 406 associated with the tagging UI on the web browser 132. The search context data 412 can also configure retrieval of a particular type of social graph elements, with the retrieval to be performed by the search back-end 450 in response to query commands corresponding to the client search query 432. In particular embodiments, the client search query 432 may include data identifying a particular social-graph element associated with the search query 432, such as, for example, an unique identifier for a digital image 409 being tagged, an identifier of a user being tagged, or another suitable identifier of a social-graph element.

In particular embodiments, the client search query 432 and a search context object identifier 433 may be sent by client system 130 to social-networking system 160 through network 110 in a client search request 431. The context object identifier (ID) 433 may be a reference to the search context data 412, so that the search context data 412 need not be sent through the network 110. The client search query 432 and context data 412 may be processed by a search front-end 434 of social-networking system 160. As an example and not by way of limitation, the search front-end 434 may be implemented using a scripting programming language, such as, for example, PHP. In particular embodiments, the search front-end 434 may extract from the client search query 432 an object identifier 436 identifying the particular social-graph element associated with the client search query 432, and perform a search of one or more search indices of data stores 164. Furthermore, the search performed by the search front-end 434 may retrieve references 440 to other social-graph elements associated with the particular social-graph element identified by the object ID 436 based at least in part on the context data 412. As an example and not by way of limitation, the social-graph elements associated with a digital image 409 that are retrieved from the data store 164 based on tagging context data 412 may include identities of the user/owner 416 that posted the digital image 409, users tagged in the digital image 409, or users that have commented on the digital image 409. As another example, the social-graph elements associated with a post that are retrieved based on comment context data 422 may include the user/owner 416 that initiated the post, users/commenters 418 that commented on the post, or users 424 that "liked" the post.

One or more expanded query commands 443 generated from a structured client search query 432 may be used in a search for objects in one or more data stores 164 of the social-networking system 160. In particular embodiments, the search front-end 434 may generate the one or more expanded query commands 443 based at least in part on the search query 432 generated by the search client 406 of client system 130. The expanded query commands 443 may be provided for a search using search indices for one or more data stores 164 of social-networking system 160. The search back-end 450 may receive a back-end search request 442 that includes the expanded query commands 443 and references to one or more social-graph elements associated with the expanded query commands 443 from the search front-end 434. In particular embodiments, the search front-end 434 may modify one or more of the client search query commands 432 to incorporate the social-graph elements associated with the client search query 432 and context data 412 to form the back-end search request 442. The back-end search request 442 can include one or more of the context signals 414 from the search context data 412, such as an owner signal 444, a tagged signal 446, and a commenter signal 448. The back-end search request 442 can also include a context object ID 433 that refers to the search context data 412, so that signal values need not be included in the back-end search request 442.

The expanded query commands 443 may be modified by the query rewriting component 460 to form a rewritten query command 462, which may include one or more query constraints. In particular embodiments, one or more of the query constraints may be social-graph elements identified based on the search context data 412. Query constraints may be identified by social-networking system 160 based on a parsing of the client search query 404 or references to particular social-graph elements identified based on the search context data 412 from the particular search client 406. Each query constraint may be a request for a particular object-type. In particular embodiments, the rewritten query command 462 may comprise query constraints in symbolic expression or s-expression form. As an example, social-networking system 160 may parse the search query 404 "Photos I like" to a query command 462 (photos_liked_by: <me>). The query command (photos_liked_by: <me>) denotes a query for photos liked by a user (i.e., <me>, which corresponds to the querying user 402), with a single result-type of photo. The query constraint may include, for example, social-graph constraints (e.g., requests for particular nodes or node-types, or requests for nodes connected to particular edges or edge-types), object constraints (e.g., requests for particular objects or object-types), location constraints (e.g., requests for objects or social-graph entities associated with particular geographic locations), other suitable constraints, or any combination thereof. In particular embodiments, the parsing of the search query 404 may be based on the grammar used to generate the search query 404. In other words, the rewritten query command 462 and its query constraints may correspond to a particular grammar.

In particular embodiments, a rewritten query command 462 may comprise a prefix and an object. The object may correspond to a particular node in the social graph 200, while the prefix may correspond to a particular edge 206 or edge-type (indicating a particular type of relationship) connecting to the particular node in the social graph 200. As an example and not by way of limitation, the query command (pages_liked_by:<user>) comprises a prefix pages_liked_by, and an object <user>. In particular embodiments, social-networking system 160 may execute a query command 462 by traversing the social graph 200 from the particular node along the particular connecting edges 206 (or edge-types) to nodes corresponding to objects specified by the query command to identify one or more initial search results (not shown) that can be passed to a ranking component 466 or used as search results 472 themselves (e.g., without being processed by the ranking component 466). As an example and not by way of limitation, the query command (pages_liked_by:<user>) may be executed by social-networking system 160 by traversing the social graph 200 from a user node 202 corresponding to <user> along like-type edges 206 to concept nodes 204 corresponding to pages liked by <user>. In one aspect, modifying the query may be based at least in part on one or more identified n-grams in the query, and the modified (e.g., rewritten) query may reference one or more second nodes referenced in the identified n-grams. Although this disclosure describes generating or modifying particular query commands in a particular manner, this disclosure contemplates generating or modifying any suitable query commands in any suitable manner.

In particular embodiments, a parsing algorithm used to generate query commands may comprise one or more parsing-configuration parameters. The parsing-configuration parameters may specify how to generate a rewritten query command 462 for a particular type of query 404 received from a user 402. The parsing-configuration parameters may specify, for example, instructions for generating a rewritten query command 462 having a specified number of query constraints for a specified number of objects of a specified object-type to be retrieved from a specified number of data stores 164. In particular embodiments, social-networking system 160 may access one or more data stores 164 in response to a search query 404 received from a user 402. Each data store 164 may store one or more objects associated with the online social network. In particular embodiments, social-networking system 160 may search each accessed data store 164 to identify one or more objects associated with the data store 164 that substantially match the search query 404. Social-networking system 160 may identify matching objects in any suitable manner, such as, for example, by using one or more string matching algorithms to match a portion of the search query 404 with a string of characters associated with each of one or more of the objects. Rewriting may use the friends_of: <owner> and friends_of: <tagged> constraints to improve recall (i.e., a measure of whether the search finds the information being searched for). As an example and not by way of limitation, in response to a search query input 404 "kais" and context data 412 associated with tagging a digital image 409, the search back-end 450 of social-networking system 160 may generate the following rewritten query command 462:

(AND (name: "kais")
(OR friends_of: <owner>)
(OR friends_of: <tagged>)).

This query command 462 contains a first query constraint (OR friends_of: <owner>), which instructs social-networking system 160 to access data store 164 to search for users that are friends of the user that owns the digital image 409 and that match the character string "kais," and to retrieve the top fifty results. The second query constraint, (OR friends_of: <tagged>), instructs social-networking system 160 to access data store 164 to search for users tagged in the digital image 409 that match the character string "kais." Social-networking system 160 may access the index servers of each data store 164 to return results that match the rewritten query command 462. Although this disclosure describes identifying particular objects in a particular manner, this disclosure contemplates identifying any suitable objects in any suitable manner. More information on accessing and searching data stores 164 may be found in U.S. patent application Ser. No. 13/560,212, filed 27 Jul. 2012, and U.S. patent application Ser. No. 13/870,113, filed 25 Apr. 2013, each of which is incorporated by reference.

Improving Search Results Based on Search Client Context

In particular embodiments, social-networking system 160 may generate improved search results 472 based on the search context data 412 of the search client(s) 406. In one aspect, as described above, the search client 406 executes in a web browser 132 or other application and receives a search query 404 from a user 402. The search client 406 generates a client search request 431 based on the search query 404, and sends the client search request 431 to a search front-end 434. The search front-end 434 generates a back-end search request 442 based on the client search request 431 and items related to objects 436 specified in the search request 431. The back-end search request 442 may also include the context object ID 433 that references the search context data 412, and/or specific signals from the search context data 412. The search front-end 434 may send one or more object IDs 436 to the data store 164 and receive one or more item IDs 440 identifying other objects that are related to the object IDs 436. The data store 164 may be, for example, an in-memory data structure such as memcache, a hybrid in-memory and disk storage system such as TAO ("The Associations and Objects"), or the like. The search front-end 434 may send the expanded query 443 to a search back-end 450 via network 110. The search back-end 450 may use a query rewriting component 460 to generate a rewritten search query 462 based on the expanded query 443. The re-written query 462 may expand the search to identify users who are related to the querying user 402 or the search context data 412 in some way, e.g., by being friends of friends of the querying user 402, being authors of comments on the page 408 (included in the commenters 418), and so on. The search back-end 450 may then send the rewritten search query 462 to a searching component 464, e.g., a search engine that searches the data stores 164 and generates initial search results (not shown).

A ranking component 466 may then rank or re-rank the initial search results produced by the expanded search query 462 using the search context data 412. The ranking component 466 may use the signals and objects included in the back-end search request 442, including the context signals 414 from the search context data 412 generated by the search client 406. As described above, the signals 414 in the search context data 412 can include a social context 415, such as an owner 416, commenters 418, tags 420, comments 422, likes 424, and shares 426. The signals can also include functions 428, web suggestions 429, and geo-location information 430. The ranking component 466 scores the objects in the set of initial search results by computing features on the objects. The features correspond to the context signals 414 and may be binary features, i.e., binary factors, that are assigned a value of 1 when present and 0 when absent. Other types of features may have continuous values. A model may be computed offline to establish a weight for particular ranges of values. If a binary feature is present, then the weight corresponding to that feature is added to a sum of weights for that feature. The sum for each object corresponds to a score that determines the object's rank, e.g., position, in the search results 472. The ranking component 466 therefore may boost more relevant search results, to be closer to the top of the list of search results 472. The top-scoring objects (as limited by the search client 406 on the page 408) can then be sent back to the web browser 132 and presented to the user 402.

As described above, a search client 406 may be part of a user interface on web browser 132 or a native application of client system 130. The search client 406 may be associated with a particular type of page of social-network system 160. Search functionality may be incorporated into content 408, e.g., pages to be viewed by the user 402, with each page having a customized search client 406 for performing a type of search relevant for that type of page or content 408. For example, a typeahead search function 428 may be used for comments and photos when tagging people. Similarly, a graph search function 428 may be used for a home page or landing page associated with the online social network. The search results 472 can be ranked differently by the ranking component 466 depending on how the search client 406 is being used, e.g., depending on the search context data 412. For example, the top five search results in a photo-tag search context (in which a photo is tagged with a user or page ID identified by a tag signal 420) are likely to be different from the top five results in a comment-tag search context (in which a comment is tagged with a user or page ID identified by a tag signal 420). The suggested search results presented to a user in each of these scenarios can be customized based on context signals 410 extracted from the content or page 408. These signals 410 from the content or page 408 may be stored in the context data 412 of the search client 406 as signals 414. The signals 414 can be used by the ranking component 466 to improve the ranking of search results 472. For example, better search results 472 or suggestions can be presented to the user by taking into account information associated with the content or page 408 on which the search client 406 user interface is presented. Although this disclosure describes improving search results 472 based on search context data 412 associated with the search client 406 in a particular manner, this disclosure contemplates improving search results 472 based on content data 408 associated with the search client 406 in any suitable manner.

In particular embodiments, social-networking system 160 may receive from the first user 402 a search query 404 inputted by (or otherwise received from) the first user 402 at a search client 406. The search client 406 can be, for example, a user interface that is presented on a page or other content 408 and can receive search query strings 404 from the first user 402. In particular embodiments, the search client 406 may be associated with context data 412 from the page or content 408 associated with the search client 406. The context data 412 may include a social context 415 of the page 408 associated with the search client 406. The social context 415 of the search client 406 ordinarily refers to edges and nodes connected to the node that corresponds to the content or page 408 associated with the search client 406. For example, the social context 415 of the post can include one or more of the following signals 414: user ID of the original poster, shown as owner 416, prior commenters on the post as commenters 418, people tagged in the post as tags 420, people tagged in the comments as comments 422, people who have liked the post as likes 424, people with whom the post has been shared as shares 426, and other signals based on the content or page 408. For example, the social context 415 can include one or more of those signals when the user 402 is commenting on a post on the page 408, In one example, when adding a new comment and tagging a person via typeahead suggestions, the people within the social context 415 of the search client 406 (e.g., the users connected by edges to the post, content, or page 408), can be ranked higher in a typeahead list, such as the dropdown 300 of FIG. 3A, than people not in the social context 415 of the search client 406 (e.g., users not connected to the post, content, or page 408). In particular embodiments, the context data 412 may identify one or more nodes of the plurality of nodes associated with the page 408. As an example and not by way of limitation, the context data 412 identifying nodes associated with the page 408 may include comments 422 on a photo on the page 408, where the photo corresponds to a first node, and each comment 422 may correspond to a second node that is connected to the first node by an edge 206. In particular embodiments, the context data 412 may identify a function 428 associated with the search client. As an example and not by way of limitation, the context data may identify a function 428 of the search client for performing a type of search relevant for that page. As described above, the function 428 can be a typeahead search function, a graph search function, or other type of search function. In particular embodiments, the context data 412 may identify web suggestions 429 that can be received from a search engine. As an example and not by way of limitation, the context data 412 may identify geographic location information 430 about the first user 402, such as current location of the first user, speed of movement of the first user, direction of movement of the first user, other suitable location information, or any combination thereof. In particular embodiments, the context data may identify one or more second nodes connected by an edge to a particular node corresponding to the page 408 of the search client 406. As an example and not by way of limitation, if the page 408 of the search client is a page for a User "C", then the context data may identify a second node 204 corresponding to the School "Stanford" connected by an edge 206 to the user node 202 for User "C". Although this disclosure describes receiving particular queries 404 and context data 412 in a particular manner, this disclosure contemplates receiving any suitable queries and context data in any suitable manner.

In particular embodiments, social-networking system 160 may generate one or more search results 472 corresponding to the query 404. Search results 472 can be improved based on the search context data 412 of the search client 406. The search can be performed by accessing a social graph 200 comprising a plurality of nodes and a plurality of edges 206. The nodes may include a first node 202 corresponding to the first user 402 of the social network, and a plurality of second nodes that each correspond to a concept or second user associated with the social network. The social context 415 of the search client can identify one or more second nodes from the plurality of second nodes associated with the page. One or more search results 472 for the query 404 can be generated by the searching component 464. Each of the search results 472 may correspond to a node of the plurality of nodes. Although this disclosure describes generating particular search results 472 in a particular manner, this disclosure contemplates generating any suitable search results in any suitable manner.

In particular embodiments, social-networking system 160 may score the search results 472 based at least in part on the signals 414 in the context data 412 associated with the search client 406, and use the scores to rank the search results 472 so that individual results better matching the query 404 appear closer to the top of the list of results. That is, search results that are more relevant to the search context data 412 associated with the search client 406 may be scored better/higher than search results that are less relevant to the search context data 412. As an example and not by way of limitation, search-client dependent signals 414 for tagging photos or images 409 may include information referencing friends of the owner of the photo, interested users (e.g. commenters 418 who comment on the photo), and tagged users 420. When scoring search results matching a query inputted into a search client for tagging such a photo, social-networking system 160 may score search results corresponding to friends of the owner (i.e., users corresponding to user nodes 202 connected by an edge to the user node 202 of the querying user) of the photo better than search results corresponding to friends-of-friends of the owner. As another example and not by way of limitation, when searching for a user of the online social network by name using a search client on a particular page, social-networking system 160 may score a subset of search results 472 corresponding to authors of comments posted on that page higher than another subset of search results 472 corresponding to users who are not authors of comments on that page. In one aspect, search results corresponding to users who are connected to the querying user 402, e.g., through a friend relationship or a signal 414 in search context data 412, may be ranked better than results corresponding to users who are not connected to the querying user 402 in either of those ways. In particular embodiments, social-networking system 160 may rank the search results 472 based on the scoring. Although this disclosure describes scoring particular search results in a particular manner, this disclosure contemplates scoring any suitable search results in any suitable manner.

In particular embodiments, social-networking system 160 may customize search results 472 based on particular limitations/requirements associated with the search client 406. Searches performed by different search clients may have requirements that are specific to each search client. As an example and not by way of limitation, searching for suggested users when tagging users in photos may require retrieval of a particular number search results (e.g., displaying the top-3 or top-5 results, instead of the usual top-8), or retrieval of only certain types of social-graph entities (e.g., users/friends, pages, etc.). As an example, the number of suggestions or results for a search query 404 may be different based on a type of media content 408 associated with the search client 406. If the search client is displayed with or near a photo or image 409, then the top three of the search results 472 may be displayed. If the search client is associated with text content, then the top eight results may be displayed. The top ten results may be displayed for search clients associated with video content. In one aspect, social-networking system 160 may filter search results based on the search client 406. As another example, when a user is tagging a photo, a displayed list of suggestions from search results 472 should include only users. On a splash page or new page, any type of entity may be suggested in a list of suggestions, including pages, locations, and users. Although this disclosure describes customizing search results in a particular manner, this disclosure contemplates customizing search results in any suitable manner.

Figure 5:
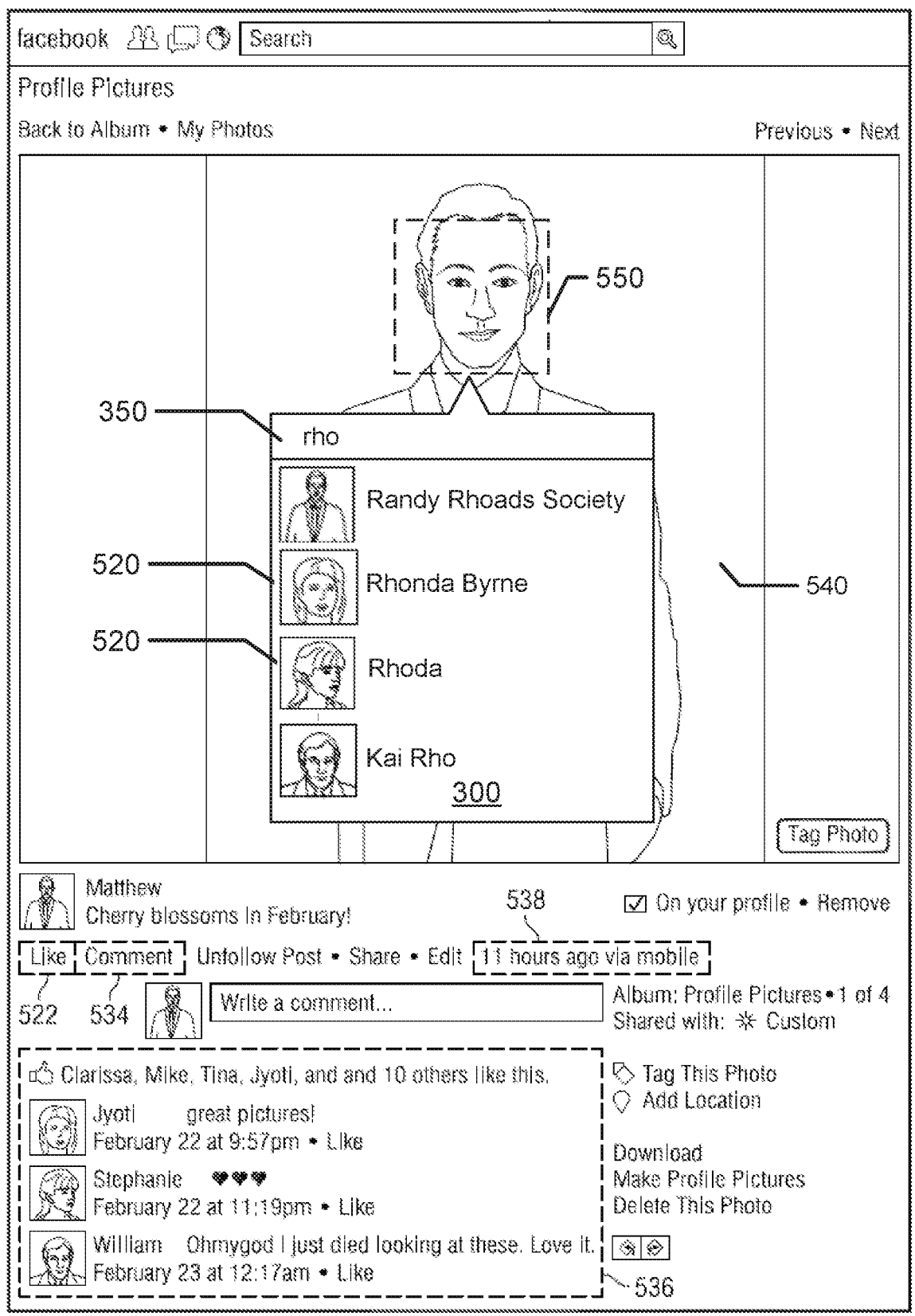
FIG. 5 illustrates an example UI with search results.

FIG. 5 illustrates an example UI with search results. In particular, FIG. 5 illustrates a page for a picture posted by the user "Matthew" of the online social network. This picture may correspond to a particular concept node 204 of social graph 200, which may be connected by an edge 206 to the user node 202 of the user "Matthew." The page may include, for example, a selectable "like" icon 522, a selectable "comment" icon 534, a history of comments and "likes" from various users in field 536, an indication of the application corresponding to the concept node in field 538, other suitable components, or any combination thereof, information about which may be included in the context data associated with the search client. In particular embodiments, in response to a search query received from a querying user, social-networking system 160 may generate one or more search results 520, where the search results correspond to the search query. Each search result may correspond to a node of the social graph 200. Social-networking system 160 may identify objects (e.g., users, photos, profile pages (or content of profile pages), etc.) that satisfy or otherwise match the search query. A search result 520 corresponding to each identified object may then be generated. Although this disclosure describes generating search results in a particular manner, this disclosure contemplates generating search results in any suitable manner. More information on generating search results may be found in U.S. patent application Ser. No. 13/731,939, filed 31 Dec. 2012, which is incorporated by reference.

In particular embodiments, social-networking system 160 may send one or more of the search results to the querying user for display based on the scores of the search results. In particular embodiments, the search results are displayed in association with the search client. As an example and not by way of limitation, social-networking system 160 may display search results in a drop-down 300 below a search field 350 as shown in FIG. 5. In particular embodiments, social-networking system 160 may send a threshold number of search results for display to the first user 402. In the example illustrated in FIG. 5, four search results matching the search string "rho" are displayed in drop-down 300, with the threshold number for the search being the top four search results. The search context data 412 may identify the threshold number of search results for display. As an example and not by way of limitation, the client search request 431 may specify that the threshold number is ten. The threshold value ten may correspond to the ten highest-ranking search results, or to search results having a score greater than ten, or meeting a threshold value of ten according to another appropriate metric. In response, the search back-end 450 may send the search results that meet the threshold back to the search client for display. As an example and not by way of limitation, social-networking system 160 may send up to the threshold number of the highest scoring search results for display to the first user 402 in response to the search request, instead of sending search results having scores that meet or exceed the threshold score. Although this disclosure describes sending particular search results in a particular manner, this disclosure contemplates sending any suitable search results in any suitable manner.

As described below, search results 520 may be sent to the first user and displayed in a drop-down menu 300 (via, for example, a client-side typeahead process), where the first user can then select an appropriate search result 520. In particular embodiments, the search results 520 may be sent to the user, for example, in the form of a list of links on the search-results page, each link being associated with a different page that contains some of the identified resources or content. In particular embodiments, each link in search results 520 may be in the form of a Uniform Resource Locator (URL) that specifies where the corresponding page is located and the mechanism for retrieving it. Social-networking system 160 may then send the search-results page to the web browser 132 on the user's client system 130. The user may then click on the URL links or otherwise select the content from the search-results page to access the content from social-networking system 160 or from an external system (such as, for example, third-party system 170), as appropriate. In particular embodiments, each search result 520 may include a link to a profile page and a description or summary of the profile page (or the node corresponding to that page). In particular embodiments, the search results may be presented and sent to the querying user as a search-results page. When generating the search results, social-networking system 160 may generate one or more snippets for each search result, where the snippets are contextual information about the target of the search result (i.e., contextual information about the social-graph entity, profile page, or other content corresponding to the particular search result). In particular embodiments, social-networking system 160 may only send search results having a score or rank over a particular threshold score or rank. As an example and not by way of limitation, social-networking system 160 may only send the top ten search results 520 to the querying user in response to a particular search query.

In particular embodiments, a user interface (UI) with search results 520 may be configured to receive input from a user selecting a region (e.g., a selected region) within a digital image 540 according to the input. As an example and not by way of limitation, the user clicks on a point of digital image 540 thereby placing a border 550 around the selected region. In particular embodiments, the shape of the selected region may be a rectangle, circle, ellipse, polygon, or any suitable shape. In particular embodiments, a line, highlight, or some other indicia may be superimposed on the digital image 540 to indicate the selected region. In particular embodiments, a "tag" in the form of text may be associated with the selected region of digital image 540. As an example and not by way of limitation, the text may include a hyperlink, an e-mail address or user identification (ID) of a friend in the social-network system 160, or any suitable information.

In particular embodiments, the UI may be configured to display a list of likely tags to associate with the selected region defined by border 550. Furthermore, search results 520 corresponding to tags may be displayed in drop-down menu 300 in response to clicking on the selected region of digital image 740. As an example and not by way of limitation, the UI may include a search-query field 350 and drop-down menu 300 auto-populated with search results 520 relevant to the querying user. As described below, search results 520 in down-down menu 300 may be displayed in a ranked order based at least in part on a score. As an unstructured search query (e.g. text) is entered in the search-query field 350, the displayed search results 520 may be modified to include search results 520 that at least partially match n-grams of the unstructured search query identified in some manner (via, for example, a client-side typeahead process). In particular embodiments, clicking any of the displayed search results 520 may associate the selected region to one or more social-graph elements referenced by the selected search result 520. Although this disclosure describes sending particular search results in a particular manner, this disclosure contemplates sending any suitable search results in any suitable manner.

In particular embodiments, social-networking system 160 may score the social-graph elements referenced by search results 520. The social-graph elements may be scored based on one or more factors, such as, for example, social-graph information, social-graph affinity, search history, privacy settings, other suitable factors, or any combination thereof. In particular embodiments, social-networking system 160 may score the objects based on a social-graph affinity associated with the querying user (or the user node 202 of the querying user). Social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. Although this disclosure describes scoring objects in a particular manner, this disclosure contemplates scoring objects in any suitable manner.

In particular embodiments, when searching data stores 164 to identify matching social-graph elements, social-networking system 160 may only identify and score up to a threshold number of matching nodes or edges in a particular data store 164. This threshold number of matching objects may then be scored and ranked by the social-networking system 160. The threshold number may be chosen to enhance search quality or to optimize the processing of search results. As an example and not by way of limitation, social-networking system 160 may only identify the top N matching social-graph elements (i.e., the number to score) in a user's data store 164 in response to a query command requesting users. The top N social-graph elements may be determined by a static ranking (e.g., ranking based on the current social-graph affinity of the user with respect to the querying user) of the social-graph elements referenced in a search index corresponding to the users data store 164. In particular embodiments, the top N identified object may be re-ranked based on the search query itself. As an example and not by way of limitation, if the number to score is 500, the top 500 objects may be identified. These 500 objects may then be ranked based on one or more factors (e.g., match to the search query or other query constraints, social-graph affinity, search history, etc.), and the top M results may then be sent to the search front-end to be checked for privacy control before being generated as search results. In particular embodiments, the top results after one or more rounds of rankings may be sent to an aggregator for a final round of ranking, where identified objects may be reordered, redundant results may be dropped, or any other type of results-processing may occur before presentation to the querying user. Although this disclosure describes identifying particular numbers of objects, this disclosure contemplates identifying any suitable numbers of objects. Furthermore, although this disclosure describes ranking objects in a particular manner, this disclosure contemplates ranking objects in any suitable manner.

FIG. 6 illustrates an example method 600 for optimizing search results based on contextual information. The contextual information can be, for example, information extracted from a page on which a user provided a search query as input to a search client. In one aspect, optimization based on contextual information, such as signals on the page, may be done by rewriting search queries on the back-end so that more relevant results may be retrieved. The method may begin at step 610, where social-networking system 160 may access a social graph 200 comprising a plurality of nodes and a plurality of edges 206 connecting the nodes. Each of the edges 206 between two of the nodes may represent a single degree of separation between them. The nodes may comprise a first node (e.g., a user node 202) corresponding to a first user associated with an online social network and a plurality of second nodes, each of which corresponds to a concept or a second user associated with the online social network.

At step 620, social-networking system 160 may receive from the first user a query inputted by the first user at a search client. The search client may be associated with context data 412 from the page associated with the search client. The context data 412 may include context signals 414 and may identify one or more second nodes of the plurality of second nodes associated with the page. As an example, a search front-end (e.g., a UI of a native application) may send the context signals to the search back-end (e.g., the social-networking system), where the query can be rewritten, and objects that match the query and context data can be retrieved from one or more data stores 164. For example, search-client dependent signals for tagging photos may include information referencing friends of the owner of the photo, interested users (e.g. users who comment on the photo), and tagged users. At step 630, social-networking system 160 may generate one or more search results corresponding to the query. Each of the search results corresponds to a node of the plurality of the plurality of nodes. For example, the search back-end may process the search query (e.g., a search for users to tag in a photo) with the context-based signals from the search front-end, and re-write the search query to form a re-written search expression that incorporates the context-based signals. The re-written search expression may include the user-provided search terms and the context-based signals. These signals may include search-client dependent signals, current location, speed, or direction of movement of the user, or web suggestions from other search engines. Rewriting the search expression may refine the search and decrease the number of objects retrieved from each data store 164, thus improving search efficiency. At step 640, social-networking system 160 may score the search results based at least in part on the context data associated with the search client. For example, the retrieved objects may be ranked based on a scoring algorithm that factors in the context-based signals. The context-based signals may be processed as binary factors, such that if a particular context-based signal is present, the score is increased by a weighting of the particular context-based signal. At step 650, social-networking system 160 may send one or more of the search results to the first user for display based on the scores of the search results. As an example, the top-scoring objects (as limited by the search client on that page) can then be sent back to the page and presented to the user. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for optimizing search results based contextual information including the particular steps of the method of FIG. 6, this disclosure contemplates any suitable method for optimizing search results based contextual information including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on a history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 7:
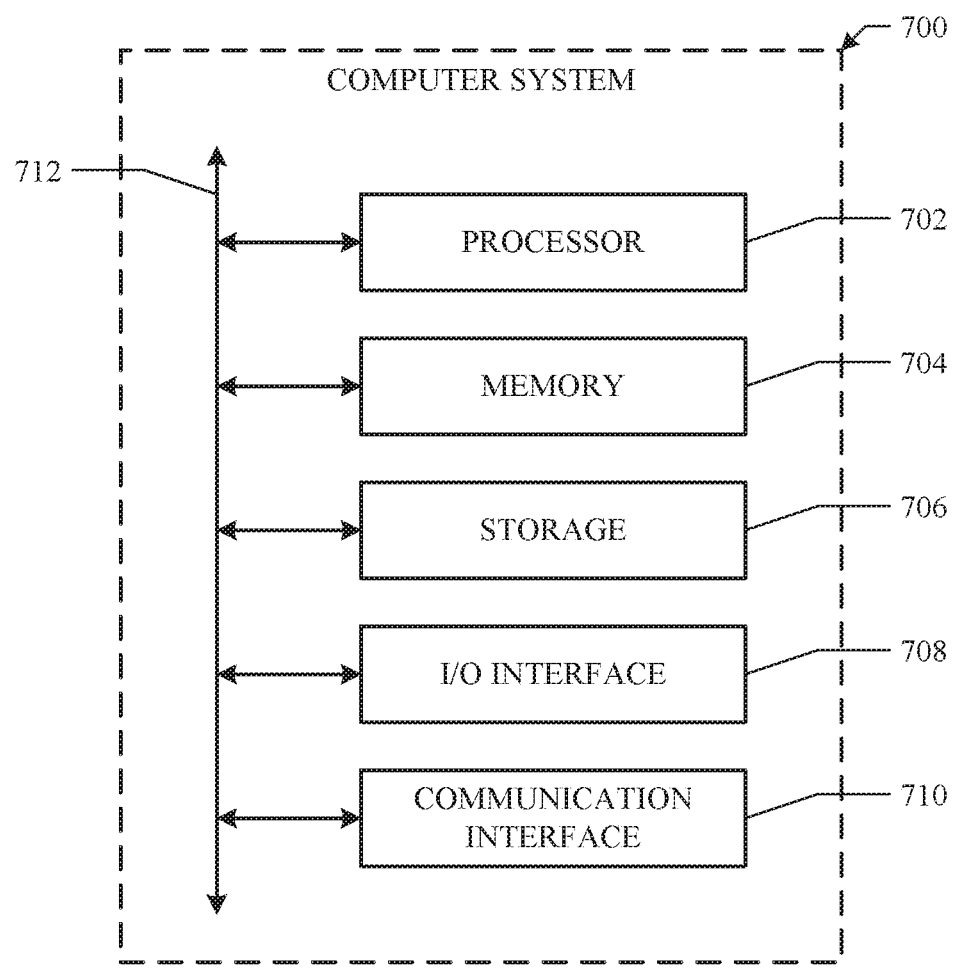
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing system:
   receiving, from a client system, a search request from a
      search client associated with a user-interface element of
      a page, wherein the search request identifies:
      a query inputted by a first user at the search client,
      a type of the page associated with the search client,
      a social context of the page associated with the search
         client, and
      a threshold number of search results for display;
   identifying one or more entities matching the query;

ranking each of the identified entities based at least in part on the type of the page associated with the search client and the social context of the page associated with the search client; and sending, to the client system, instructions for presenting a search-results interface comprising the threshold number of search results corresponding to the threshold number of top ranking identified entities.

2. The method of claim 1, wherein the social context identifies social data from an online social network associated with the page associated with the search client.

3. The method of claim 1, wherein the social context identifies one or more of: one or more tags associated with the page, one or more comments associated with the page, one or more likes associated with the page, one or more shares associated with the page, one or more commenters associated with the page, one or more owners associated with the page, or any combination thereof.

4. The method of claim 1, wherein the search request further identifies a type of search relevant to the type of the page associated with the search client.

5. The method of claim 4, wherein the type of search is a typeahead search or a graph search.

6. The method of claim 1, wherein the search request further identifies one or more of: web suggestions from a search engine, current location of the first user, speed of movement of the first user, direction of movement of the first user, or any combination thereof.

7. The method of claim 1, wherein identifying one or more entities matching the query comprises:
generating a query command based at least in part on the received query and the search request; and
retrieving, from one or more data stores of an online social network, one or more references to the one or more entities corresponding to the query command, respectively.

8. The method of claim 1, wherein ranking each of the identified entities is further based at least in part on one or more binary factors associated with the search request and a weighting of one or more of the binary factors.

9. The method of claim 1, wherein the instructions for presenting a search-results interface are generated based at least in part on the type of the page associated with the search client.

10. The method of claim 1, wherein one or more of the search results is a suggested query comprising a reference to one or more entities.

11. The method of claim 1, wherein the query is inputted by the first user as a character string comprising one or more characters into the user-interface element, the user-interface element comprising a query field of a native application associated with an online social network or a webpage of an online social network accessed by a browser client.

12. The method of claim 1, wherein the query is associated with one of tagging, commenting, or sharing content associated with an online social network.

13. The method of claim 1, wherein the query is associated with data referencing one or more friends of an owner of a digital image associated with the query, interested users of the digital image, or users tagged in the digital image.

14. The method of claim 1, further comprising
accessing a social graph comprising a plurality of nodes and a plurality of edges connecting the nodes, each of the edges between two of the nodes representing a single degree of separation between them, the plurality of nodes comprising:
a first node corresponding to the first user; and
a plurality of second nodes corresponding to a plurality of entities associated with an online social network, respectively.

15. The method of claim 14, wherein ranking each of the identified entities is further based at least in part on a social-graph affinity of the first node with the second node corresponding to the identified entity.

16. The method of claim 14, wherein the social context of the page further identifies one or more second nodes, of the plurality of second nodes, associated with the page.

17. The method of claim 14, wherein the page associated with the search client corresponds to a particular node of the plurality of second nodes, and wherein the social context of the page comprises information identifying one or more second nodes, of the plurality of second nodes, connected by an edge to the particular node corresponding to the page of the search client.

18. The method of claim 14, wherein one or more of the search results is a suggested structured query comprising references to one or more edges and one or more nodes.

19. One or more computer-readable non-transitory storage media embodying software that is operable when executed to:
receive, from a client system, a search request from a search client associated with a user-interface element of a page, wherein the search request identifies:
a query inputted by a first user at the search client,
a type of the page associated with the search client,
a social context of the page associated with the search client, and
a threshold number of search results for display;
identify one or more entities matching the query;
rank each of the identified entities based at least in part on the type of the page associated with the search client and the social context of the page associated with the search client; and
send, to the client system, instructions for presenting a search-results interface comprising the threshold number of search results corresponding to the threshold number of top ranking identified entities.

20. A system comprising: one or more processors; and a memory coupled to the processors comprising instructions executable by the processors, the processors operable when executing the instructions to:
receive, from a client system, a search request from a search client associated with a user-interface element of a page, wherein the search request identifies:
a query inputted by a first user at the search client,
a type of the page associated with the search client,
a social context of the page associated with the search client, and
a threshold number of search results for display;
identify one or more entities matching the query;
rank each of the identified entities based at least in part on the type of the page associated with the search client and the social context of the page associated with the search client; and
send, to the client system, instructions for presenting a search-results interface comprising the threshold number of search results corresponding to the threshold number of top ranking identified entities.

21. The method of claim 1, wherein the search client is a first search client of a plurality of search clients associated with a plurality of types of user-interface elements, and wherein each search client of the plurality of search clients is customized to perform a type of search based on its respective requirements.

22. The method of claim 1, wherein the type of the page is based on a page identifier of the page, and wherein the type of the page corresponds to a type of content available on the page.

* * * * *